United States Patent
Shyy et al.

(10) Patent No.: US 6,805,014 B1
(45) Date of Patent: Oct. 19, 2004

(54) METHOD OF MEASURING FLOW RATE OF FLOWABLE MATERIAL UNDER CONTINUOUS FLOW CONDITIONS, AND AN IN-LINE CONTINUOUS FLOW METER

(75) Inventors: Yuh-Yuan Shyy, Ames, IA (US); Manjit K. Misra, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 10/336,256

(22) Filed: Jan. 3, 2003

Related U.S. Application Data
(60) Provisional application No. 60/346,588, filed on Jan. 8, 2002.

(51) Int. Cl.⁷ .................................................. G10F 1/30
(52) U.S. Cl. .................................................. 73/861.73
(58) Field of Search .................... 73/861.73, 861.74

(56) References Cited

U.S. PATENT DOCUMENTS

| | | | | |
|---|---|---|---|---|
| 3,056,293 A | * | 10/1962 | Ofner | 73/198 |
| 3,640,136 A | * | 2/1972 | Nolte | 73/861.73 |
| 3,945,532 A | * | 3/1976 | Marks | 222/55 |
| 4,067,238 A | * | 1/1978 | Oetiker | 73/861.73 |
| 4,157,661 A | | 6/1979 | Schindel | |
| 4,440,029 A | | 4/1984 | Tomiyasu et al. | |
| 4,637,262 A | | 1/1987 | Vesa | |
| 4,765,190 A | | 8/1988 | Strubbe | |
| 4,788,930 A | | 12/1988 | Matteau | |
| 5,335,554 A | | 8/1994 | Kempf et al. | |
| 5,343,761 A | | 9/1994 | Myers | |
| 5,423,456 A | | 6/1995 | Arendonk et al. | |
| 5,561,250 A | | 10/1996 | Myers | |
| 5,895,865 A | * | 4/1999 | Ozawa | 73/861.73 |

OTHER PUBLICATIONS

FEEDPRO—A Step Up to Better Pork Production Through Improved Feed Blenging, Pella Electronics Co., Inc., Pella, Iowa, USA.

* cited by examiner

*Primary Examiner*—Harshad Patel

(57) ABSTRACT

A method of determining the rate of flow of a flowable material, particulate or liquid, through a flowable material passageway, comprising causing the material passing through the passageway to move downwardly by gravity slowing the downward movement of material as compared to free falling gravitational movement measuring the weight of material passing slowly downwardly with respect to the passageway; causing an electronic signal to be generated in response to the magnitude of the weight measuring; and connecting the electronic signal to a read out display to reflect the flow rate of material with respect to units of weight with respect to units of time.

13 Claims, 3 Drawing Sheets

Fig. 1

METHOD OF MEASURING FLOW RATE OF FLOWABLE MATERIAL UNDER CONTINUOUS FLOW CONDITIONS, AND AN IN-LINE CONTINUOUS FLOW METER

CROSS REFERENCE TO A RELATED APPLICATION

This application is based upon Provisional Patent Application Ser. No. 60/346,588 filed Jan. 8, 2002.

BACKGROUND OF THE INVENTION

Monitoring and managing material flow through a passageway at different check points in the passageway in real time for conditioning of seeds, for example, can increase operating efficiency and can improve profitability. However, no seed meter is available that meets the criteria of minimum damage to seeds, accuracy of measurement, cost effectiveness, and the feasibility of physical installation for retrofitting the flow meter in existing operations.

Existing devices have limitations in many areas, e.g., they draw a sample from the flow and measure the flow rate according to the weight per unit of time; or they employ a moving mechanism (belt or auger) to move the product and weigh the moving device with the product loaded thereon. U.S. Pat. Nos. 5,423,456; 4,788,930; and 4,765,190 are illustrative of this method. Other devices measure the pressure, displacement or impact due to the force generated by the product flow (U.S. Pat. Nos. 4,157,661; 4,440,029; 5,335,554, and 4,637,262). Similar problems arise if the flowable material is a liquid.

Therefore, it is a principal object of this invention to provide a method of measuring flow rate of flowable material, including particulate material or liquids under continuous flow conditions, and an in-line continuous flow meter which is accurate, non-damaging to the material, easily adaptable to existing flow ways, cost effective, and gravity operated without moving mechanisms.

These and other objects will be apparent to those skilled in the art.

SUMMARY OF THE INVENTION

A method of determining the rate of flow of a continuously flowing material through a passageway involves causing the material to move continuously downwardly by gravity in the passageway; placing baffle means in the path of the material to slow its downward movement and to create some dwell time on the baffle means of the material as it passes over the baffle means; intermittently determining the weight of the material passing over the baffle means with respect to increments of time; intermittently averaging data as to the weight collected from the preceding step, producing electronic signals from the values resulting from the averaging data; and converting the electronic signals to a flow rate of units of weight of material with respect to units of time.

The flow meter that measures the material flow in the passageway includes an inner housing resiliently suspended in spaced relation within an outer housing. The inner housing has an inlet upper end, and an outlet lower end. At least one baffle extends downwardly and inwardly from an inner surface of the inner housing within the path of the material to slow the downward flow of material.

A load cell on the inner surface of the outer cell measures the weight of the material on the baffle, preferably on an intermittent basis, and sends an electronic signal corresponding to the weighed material which transforms the signal to a flow rate with respect to units of time.

The flowing material may be either particulate material or liquids.

DESCRIPTION OF THE PREFERRED EMBODIMENT

Figure 1:
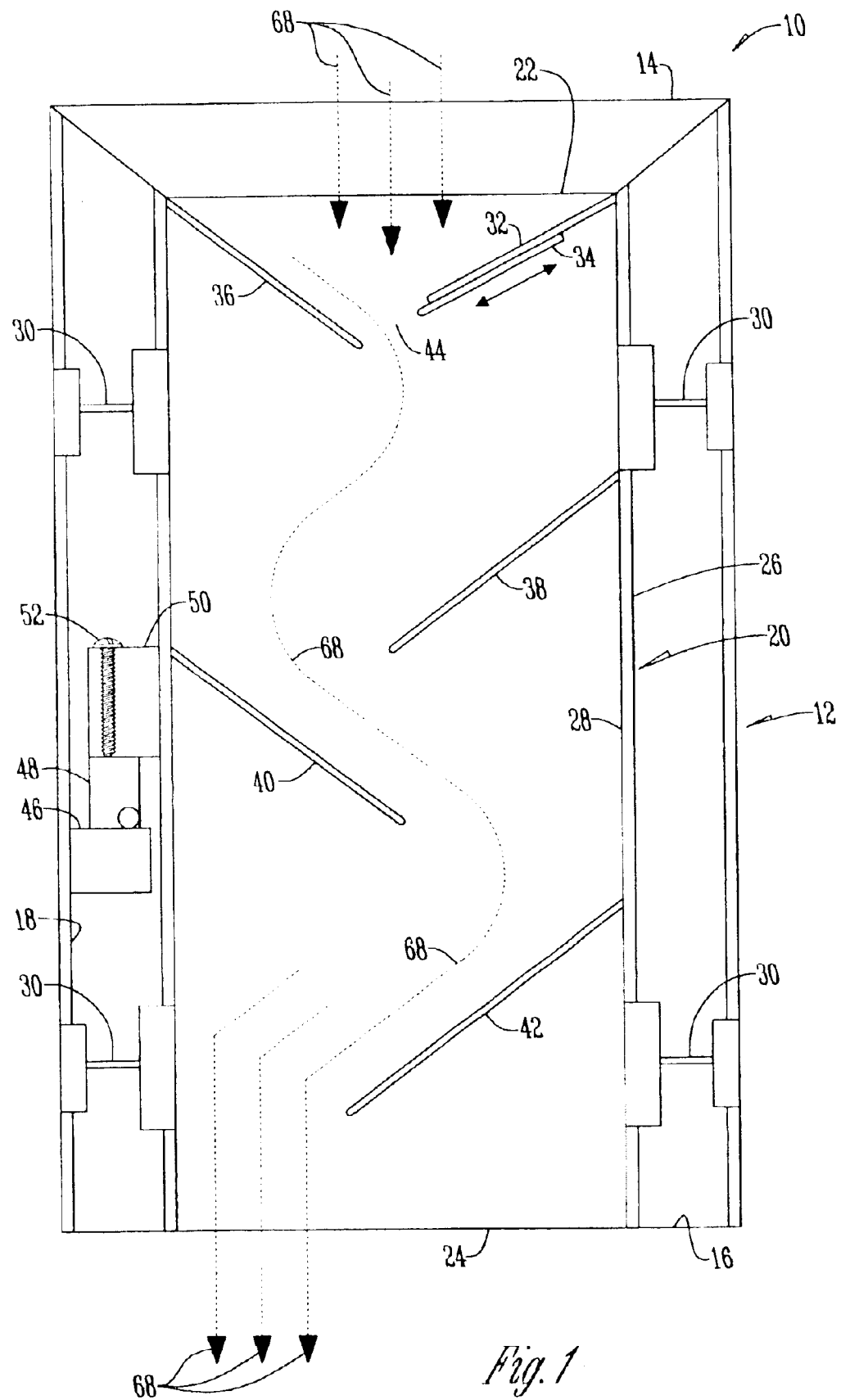
FIG. 1 is a vertical sectional view taken through the flow meter.

The description of the invention hereafter will refer primarily to particulate material. It should be understood that this invention is applicable to flowable material whether it be particulate material or liquid material. As such, statements made in regard to particulate material will be equally applicable to liquid material. With reference to FIG. 1, a flow meter 10 includes an outer cylinder or housing 12 which has a top 14, a bottom 16, on an inner surface 18. An inner cylinder or housing 20 is located within housing 12 in spaced relation thereto, and has a top 22, a bottom 24, an outer surface 26 and an inner surface 28. The inner housing 20 is resiliently suspended with housing 12 by leaf spring assemblies 30 which extend between the inner surface 18 of housing 12 and the outer surface 26 of housing 20.

A diagonal semi-circular plate 32 extends downwardly and inwardly into inner housing 20 from its upper end and has a lower edge that terminates short of the vertical axis of the housing 20. A conventional adjustable valve plate 34 (FIG. 1) is secured in any convenient fashion to regulate flow of particulate material down through meter 10 as will be discussed below.

Figure 2:
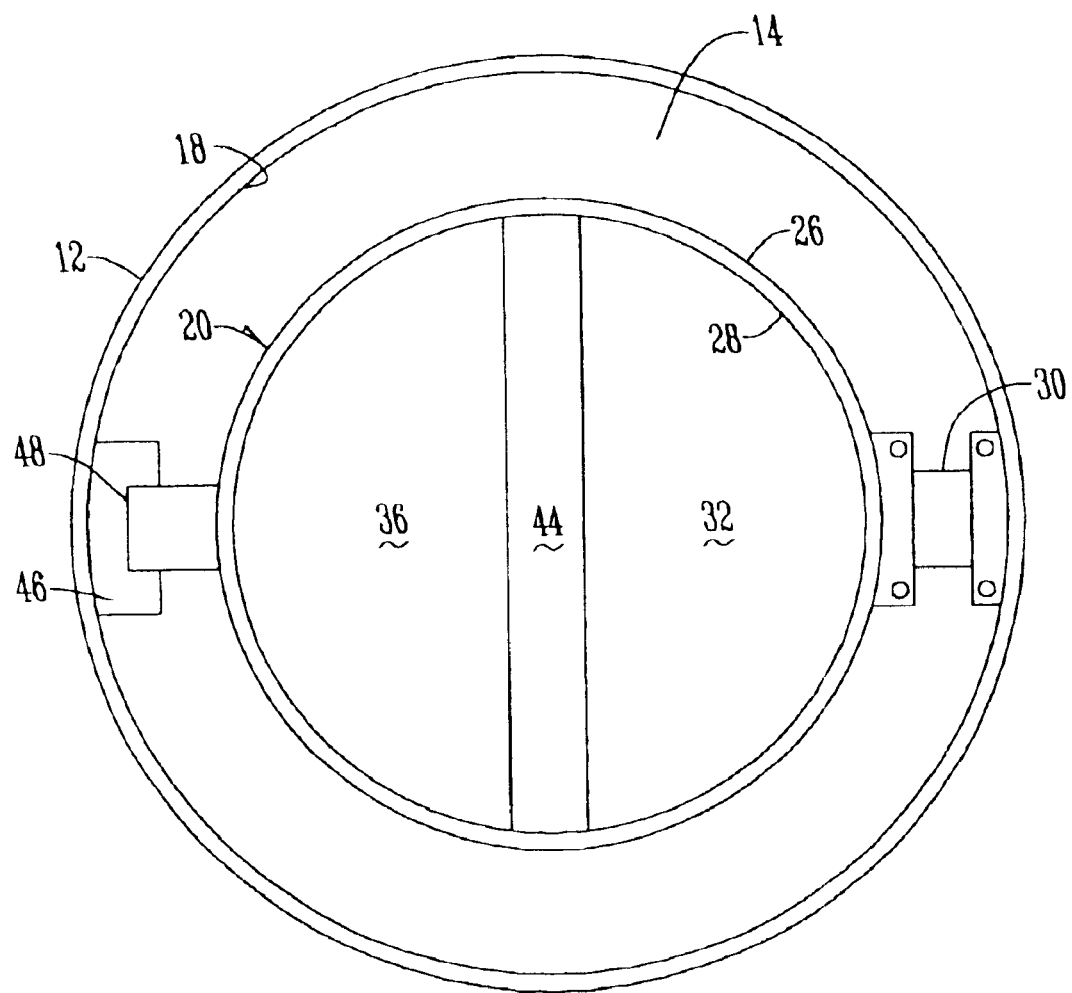
FIG. 2 is a top plan view thereof.

Similarly, semi-circular plates 36, 38, 40 and 42 are secured within housing 20 to extend downwardly and inwardly into the housing at progressively different levels (FIG. 1). The plates 38 and 42 are wider than plates 32 so that their respective lower edges interrupt any straight vertical flow of particulate material downwardly through housing 20 so as to create an alternately oblique pattern of flow of particulate material downwardly through the meter 10. (The circuitous flow of material within housing 20 depicted by the dotted line adjacent the numeral 68 in FIG. 1). This phenomenon serves to slow down the vertical movement of material through the meter as the material engages each plate. The throat 44 (FIGS. 1 and 2) can be selectively adjusted in width by the plate 34 (FIG. 1).

A load cell base 46 is secured to the inner surface 18 of outer housing 12 and supports conventional load cell 48 which in turn engages block 50 secured to the outer surface 26 of inner housing 20. This arrangement imparts the weight of housing 20 and the particulate material moving over plates 32, 36, 38, 40 and 42 onto the load cell 48. An adjustment screw 52 on block 50 is used to cause the load cell to factor out of its sensitivity the dead load of the housing itself, so that the load cell is registering only the weight of material that experiences movable dwell time on the plates 36–42.

Figure 3:
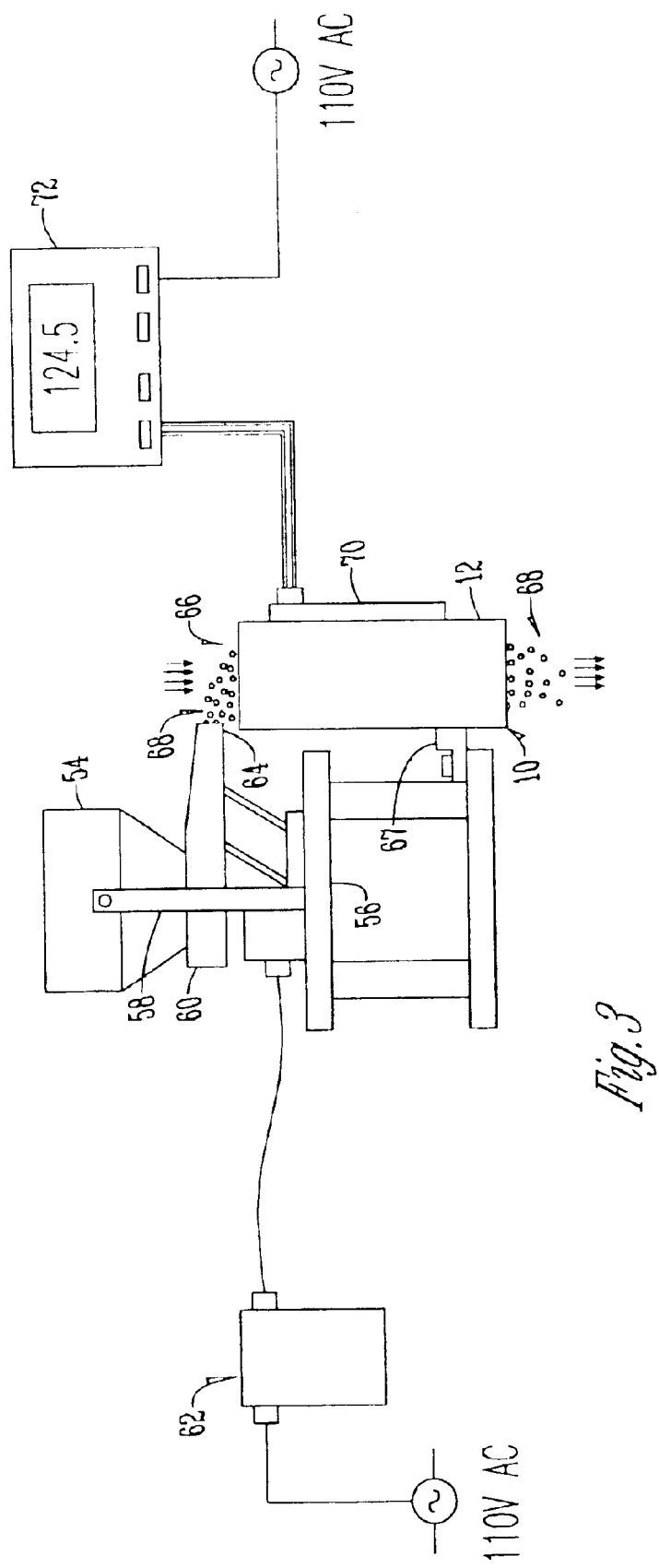
FIG. 3 is a schematic view of the flow meter imposed in a material flow way.

The use of the flow meter 10 is schematically shown in FIG. 3. A material hopper 54 is supported on stand 56 mounted on a supporting surface by legs 58. A conventional vibrator feeder tray 60 is supported on legs 58 underneath hopper 54. The feeder tray 60 is conventionally controlled by feeder controller 62 which has a discharge end 64. The numeral 66 generally designates a flow way indicating the gravitational flow of material 68 from the hopper 54 and feeder 60 to the discharge end 64 of the feeder 60. If the flowable material is liquid material, the vibrator feed tray may not be necessary, depending on the visocity of the liquid material.

The meter 10 is imposed into the flow way 66 by means of bracket 67 secured to stand 56. The particulate material 68 (e.g., corn or soybean seeds) proceeds downwardly through the sensor 10 in the manner described above along the circuitous path shown by the dotted lines in housing 20 in FIG. 1. The weight of the material impinging on 36–42 is transferred to the load cell 48 in the manner described above, whereupon the conventional load cell delivers an electronic output signal through signal output harness 70 to a conventional digital display 72. Preferably, the load cell senses the weight of the material every 15 seconds or so, and a plurality of such readings are averaged to permit the digital display to show the flow rate of the material through the meter 10 in units of weight with respect to units of time.

It is therefore seen that the flow rate of this invention can measure flow rates accurately, without damaging the material, and which can be adapted to existing flow ways, and which can measure flow rates continuously by gravity feeding for both particulate and liquid material, thus achieving all of its stated objectives.

We claim:

1. A method of determining the rate of flow of a flowable material through a material passageway, comprising, causing the flowable material to move continuously downwardly by gravity in the passageway; placing baffle means in the path of the flowable material to slow the downward movement of the flowable material and to create some dwell time on the baffle means of the flowable material as the flowable material passes over the baffle means; intermittently determining the weight of the flowable material passing over the baffle means with respect to increments of time; intermittently averaging data as to the weight collected from the preceding step, producing electronic signals from the values resulting from the averaging data; and converting the electronic signals to a flow rate of units of weight of material with respect to units of time.

2. The method of claim 1 wherein the passageway through which the flowable material passes includes an inner cylinder resiliently suspended in spaced relation within an outer cylinder, and the baffle means is positioned within the inner cylinder, and the weight of the flowable material passing through the inner cylinder is determined by a load cell affixed to an outer surface of the inner cylinder.

3. The method of claim 2 wherein the baffle means includes at least one downwardly and inwardly extending plate means having an upper edge connected to an inner surface of the inner cylinder.

4. The method of claim 1 wherein the flowable material is a particulate material.

5. The method of claim 1 wherein the flowable material is a liquid material.

6. A method of determining the rate of flow of a flowable material through a flowable material passageway, comprising, causing the material passing through the passageway to move downwardly by gravity, slowing the downward movement of material as compared to free falling gravitational movement, measuring the weight of material passing slowly downwardly with respect to the passageway, causing an electronic signal to be generated in response to the magnitude of the weight measuring, and connecting the electronic signal to a read out means to reflect the flow rate of material with respect to units of weight with respect to units of time.

7. The method of claim 6 wherein the slowing of downward movement of material is accomplished by passing the material through a circuitous path from vertically positioned sloping baffles alternately oppositely positioned to create the circuitous path.

8. The method of claim 6, wherein the passageway through which the flowable material passes includes an inner cylinder resiliently suspended in spaced relation within an outer cylinder, and the baffle means is positioned within the inner cylinder, and the weight of the flowable material passing through the inner cylinder is determined by a load cell affixed to an outer surface of the inner cylinder.

9. The method of claim 6 wherein the flowable material is a particulate material.

10. The method of claim 6 wherein the flowable material is a liquid material.

11. A flow meter for determining the flow rate of flowable material flowing continuously by gravity through a passageway, comprising, an inner housing resiliently suspended in spaced condition from an outer housing, the inner housing having an inlet upper end, and an outlet lower end, at least one baffle extending downwardly and inwardly from an inner surface of the inner housing to slow the flowable material flowing downwardly through the inner housing, and to provide dwell time of flowable material passing. thereover, a load cell on the inner surface of the outer housing to measure intermittently the weight of the flowable material on the baffle, and to send an electronic signal corresponding to the magnitude of the weight, and means to receive and convert the electronic signal to a flow rate of units of weight with respect to units of time.

12. The flow meter of claim 11 wherein leaf springs connect the inner housing to the outer housing.

13. A method of determining the rate of flow of a flowable material through a flowable material passageway, comprising, causing the material passing through the passageway to move downwardly by gravity, slowing the downward movement of material as compared to free falling gravitational movement by passing the material through a circuitous path from vertically positioned sloping baffles alternately and oppositely mounted to an interior side wall of the passageway to create the circuitous path, measuring the weight of material passing slowly downwardly with respect to the passageway, causing an electric signal to be generated in response to the magnitude of the weight measuring, and connecting the electronic signal to a read out means to reflect the flow rate of material with respect to units of weight with respect to units of time.

\* \* \* \* \*